United States Patent
Suzuki et al.

(10) Patent No.: US 10,563,347 B2
(45) Date of Patent: *Feb. 18, 2020

(54) ANTIBACTERIAL/ANTIFUNGAL FINISHED PRODUCT PRODUCTION METHOD, AND ANTIBACTERIAL/ANTIFUNGAL FINISHED PRODUCT PRODUCED BY THE METHOD

(71) Applicant: OSAKA KASEI CO., LTD., Osaka-shi, Osaka (JP)

(72) Inventors: Kimio Suzuki, Osaka (JP); Tomohide Kanda, Osaka (JP)

(73) Assignee: OSAKA KASEI CO., LTD., Osaka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/503,871

(22) PCT Filed: Sep. 16, 2015

(86) PCT No.: PCT/JP2015/076215
§ 371 (c)(1),
(2) Date: Feb. 14, 2017

(87) PCT Pub. No.: WO2016/043202
PCT Pub. Date: Mar. 24, 2016

(65) Prior Publication Data
US 2017/0260688 A1    Sep. 14, 2017

(30) Foreign Application Priority Data

Sep. 18, 2014   (JP) ................................ 2014-189755

(51) Int. Cl.
| | |
|---|---|
| *D06M 13/463* | (2006.01) |
| *C08J 7/06* | (2006.01) |
| *D06M 101/32* | (2006.01) |
| *D06M 101/34* | (2006.01) |
| *D06M 101/38* | (2006.01) |
| *D06M 101/06* | (2006.01) |

(52) U.S. Cl.
CPC ........... *D06M 13/463* (2013.01); *C08J 7/065* (2013.01); *D06M 2101/06* (2013.01); *D06M 2101/32* (2013.01); *D06M 2101/34* (2013.01); *D06M 2200/00* (2013.01); *D06M 2400/01* (2013.01)

(58) Field of Classification Search
CPC .. D06M 13/46–13/477; D06M 2400/01; C08J 7/065; C08J 7/08; C08G 63/91; C08G 18/833; C08G 69/48
See application file for complete search history.

(56) References Cited

U.S. PATENT DOCUMENTS

| | | | | |
|---|---|---|---|---|
| 7,015,275 | B1* | 3/2006 | Aga ......................... | C09K 3/18 |
| | | | | 524/544 |
| 7,858,106 | B2 | 12/2010 | Nonaka | |
| 2005/0244440 | A1 | 11/2005 | Nakamura et al. | |
| 2007/0042198 | A1* | 2/2007 | Schonemyr ............ | A01N 25/34 |
| | | | | 428/447 |
| 2010/0086511 | A1* | 4/2010 | Sakamoto .............. | A01N 65/00 |
| | | | | 424/76.6 |
| 2010/0113537 | A1 | 5/2010 | Nonaka | |

FOREIGN PATENT DOCUMENTS

| | | |
|---|---|---|
| GB | 2010851 A | 7/1979 |
| JP | 45-30080 B1 | 9/1970 |
| JP | 54-86584 A | 7/1979 |
| JP | 60-2778 A | 1/1985 |
| JP | 3-16423 B2 | 3/1991 |
| JP | 9-117365 A | 5/1997 |
| JP | 2002-179503 A | 6/2002 |
| JP | 2003-105674 A | 4/2003 |
| JP | 2004-19009 | 1/2004 |
| JP | 2004-509220 A | 3/2004 |
| JP | 2005-334305 A | 12/2005 |
| JP | 2006-249645 A | 9/2006 |
| JP | 2008-115506 A | 5/2008 |
| JP | 2012-1868 A | 1/2012 |
| JP | 2013-14551 A | 1/2013 |
| WO | 2002/022923 A3 | 3/2002 |
| WO | WO-0222923 A2 * | 3/2002 ............. A01N 25/10 |
| WO | 2008/035734 A1 | 3/2008 |

OTHER PUBLICATIONS

Translation of Tables 1 and 2 of JP 2004-19009A (Year: 2004).*
International Search Report dated Dec. 22, 2013, issued in counterpart International Application No. PCT/JP2015/076215 (2 pages).
Notification of Transmittal of Copies of Translation of the International Preliminary Report on Patentability (Form PCT/IB/338) issued in counterpart International Application No. PCT/JP2015/076215 dated Mar. 30, 2017, with Forms PCT/IB/373 and PCT/ISA/237. (11 pages).

* cited by examiner

*Primary Examiner* — Ramsey Zacharia
(74) *Attorney, Agent, or Firm* — Westerman, Hattori, Daniels & Adrian, LLP

(57) ABSTRACT

According to the present disclosure, a resin product is brought into contact with a treatment liquid containing an antibacterial antifungal compound (A) of a quaternary ammonium salt compound having a molecular weight of not greater than 1500 and, in this state, heat-treated under a normal atmospheric pressure or under an increased pressure, whereby the antibacterial antifungal compound (A) is immobilized on at least a surface of the resin product. Thus, an excellent antibacterial/antifungal finished product having water resistance and laundry durability is provided.

14 Claims, No Drawings

ANTIBACTERIAL/ANTIFUNGAL FINISHED PRODUCT PRODUCTION METHOD, AND ANTIBACTERIAL/ANTIFUNGAL FINISHED PRODUCT PRODUCED BY THE METHOD

TECHNICAL FIELD

The present disclosure relates to a production method for an antibacterial/antifungal finished product having water resistance and laundry durability, and an antibacterial/antifungal finished product produced by the production method.

BACKGROUND ART

Bacteria and fungi (mold) are liable to badly odorize, stain and deteriorate fiber products, and cause human health hazards, resulting in immeasurable human losses and economic losses. Particularly, MRSA (methicillin-resistant *staphylococcus aureus* which is resistant to methicillin antibiotics) which occurred in the United Kingdom in 1981 thereafter spread throughout the world to cause hospital infections. Recently, multiple drug-resistant bacteria which are resistant to various antibiotics such as methicillins, macrolides, quinones and β-lactams have shocked medical professionals. Further, mycosis caused by specific fungi (terminal cancer patients, AIDS patients and immunodeficient patients administered with anticancer drugs or steroid drugs are liable to suffer from infection of their internal organs and brains with the fungi) are of serious concern to medical professionals.

In order to prevent damage from the bacteria and the fungi, studies have been conducted on methods of incorporating antibacterial and antifungal compounds in fiber products such as bedding materials and garments, household articles, industrial materials and the like and maintaining water resistance, laundry durability and other effects of these products. Some of these methods have been put into practical use.

For example, a carpet structure having antibacterial, antifungal, deodorant and insect-repellant functions has been proposed, which is produced by kneading silver ion-containing soluble glass and a polyolefin resin together, forming the resulting mixture into a nonwoven fabric, and stacking the nonwoven fabric on a carpet (see PTL 1). However, the carpet structure does not have sufficient effects, because fibers of the carpet of the carpet structure are not directly imparted with antibacterial and antifungal properties.

On the other hand, a fiber product finishing method is known in which a fiber product requiring a laundry durability is resin-treated with a quaternary ammonium salt compound, an antibacterial cationic guanidine compound, a polycarboxylic acid and a crosslinking agent (see PTL 2). This finishing method imparts the fiber product only with the antibacterial property, and its antifungal property imparting effect is unknown. Further, the effective antibacterial component is removed together with the resin from the fiber product when the fiber product is repeatedly laundered. Problematically, the antibacterial property is lost with time. Further, the resin treatment hardens the fiber product to deteriorate the texture and the air permeability of the fiber product.

RELATED ART DOCUMENT

Patent Document

PTL 1: JP-A-HEI9(1997)-117365
PTL 2: JP-A-2003-105674

SUMMARY OF INVENTION

In the conventional technology, there is no known finishing method in which an antibacterial antifungal agent having excellent antibacterial and antifungal effects against various types of bacteria and fungi can be applied to resin products including fiber products in a water-resistant and laundry-durable manner. Therefore, development of such a finishing method is desired.

In view of the foregoing, it is an object to provide a production method for an excellent antibacterial/antifungal finished product having water-resistant and laundry-durable antibacterial and antifungal properties, and an antibacterial/antifungal finished product produced by the production method.

According to a first inventive aspect to achieve the aforementioned object, there is provided an antibacterial/antifungal finished product production method for producing an antibacterial/antifungal finished product having antibacterial and antifungal properties, the method including the steps of: preparing a resin product; preparing a treatment liquid containing an antibacterial antifungal compound (A) of a quaternary ammonium salt compound having a molecular weight of not greater than 1500; and immobilizing the antibacterial antifungal compound on at least a surface of the resin product by heat-treating the resin product under a normal atmospheric pressure or under an increased pressure with the resin product in contact with the treatment liquid.

According to a second inventive aspect, the resin product comprises at least one resin selected from a polyester resin, a polyamide resin, an acryl resin and a polyurethane resin in the antibacterial/antifungal finished product production method. According to a third inventive aspect, the resin product comprises the polyester resin in the antibacterial/antifungal finished product production method.

According to a fourth inventive aspect, in the step of immobilizing the antibacterial antifungal compound (A) on at least the surface of the resin product, having the resin product in contact with the treatment liquid is performed by spraying the treatment liquid onto the resin product, by immersing the resin product in the treatment liquid or by coating the resin product with the treatment liquid, and the heat-treating is performed in a gas at 70° C. to 230° C. under normal atmospheric pressure or under increased pressure. According to a fifth inventive aspect, in the step of immobilizing the antibacterial antifungal compound (A) on at least the surface of the resin product, having the resin product in contact with the treatment liquid is performed by immersing the resin product in the treatment liquid, and the heat-treating is performed in the treatment liquid at 70° C. to 230° C. under normal atmospheric pressure or under increased pressure.

According to a sixth inventive aspect, there is provided an antibacterial/antifungal finished product produced by the production method according to any of the first to fifth inventive aspects, the antibacterial/antifungal finished product including a resin product, and an antibacterial antifungal compound (A) immobilized on at least a surface of the resin product, the antibacterial antifungal compound (A) being a quaternary ammonium salt compound having a molecular weight of not greater than 1500, the antibacterial/antifungal finished product having bactericidal activity values of not less than 0 against at least three types of bacteria selected from *Staphylococcus aureus*, methicillin-resistant *Staphylococcus aureus*, *Klebsiella pneumoniae*, *Bacillus subtilis*, *Bacillus cereus*, *Escherichia coli*, *Salmonella typhimurium* and *Pseudomonas aeruginosa*, and antifungal activity values of not less than 2 against at least two types of fungi selected from *Aspergillus niger, Penicillium citrinum, Cladosporium cladosporioides, Trichophyton mentagrophytes* and *Candida albicans.*

According to a seventh inventive aspect, the resin product of the antibacterial/antifungal finished product comprises at least one resin selected from a polyester resin, a polyamide resin, an acryl resin and a polyurethane resin. According to an eighth inventive aspect, the resin product of the antibacterial/antifungal finished product comprises the polyester resin.

According to a ninth inventive aspect, the resin product of the antibacterial/antifungal finished product is a fiber product. According to a tenth inventive aspect, the resin product of the antibacterial/antifungal finished product is one of a resin sheet, a resin film and a cured resin product having a predetermined shape.

In the present disclosure, the term "resin product" means a material product from which the final product is produced, and the final product may have the same shape as the material product without modification in the shape of the material product.

In the present disclosure, the expression "to immobilize the antibacterial antifungal compound (A)" means that the antibacterial antifungal compound (A) is chemically bonded to the resin product. Examples of the chemical bonding include covalent bonding, ion bonding, hydrogen bonding and coordinate bonding.

The inventors conducted intensive studies to develop a method of imparting a resin product (e.g., any of various industrial materials and household articles including clothes) with water-resistant, laundry-durable antibacterial and antifungal properties. As a result, the inventors found that, where the quaternary ammonium salt compound (A) having a molecular weight not greater than the predetermined level is used out of quaternary ammonium salt compounds conventionally known as antibacterial agents, the quaternary ammonium salt compound (A) can be directly bonded to functional groups of the resin of the resin product to be immobilized on the resin product by dissolving or dispersing the quaternary ammonium salt compound (A) in a solvent such as water for the preparation of the treatment liquid and heat-treating the resin product with the treatment liquid in contact with the resin product without forming a resin coating with the use of a coating formable compound. Further, the inventors found that the compound (A) immobilized on the resin product has excellent antibacterial and antifungal effects against a wide variety of bacteria including MRSA and fungi, making it possible to impart various resin products with water-resistant, laundry-durable antibacterial and antifungal properties. Thus, the inventors attained the present disclosure.

There are a lot of compounds known as the antibacterial agents and the antifungal agents. It is known that some of these compounds have an antibacterial effect against specific bacteria (e.g., Gram-positive bacteria), and some of the compounds have a strong antifungal effect against specific fungi (e.g., *Trichophyton mentagrophytes*). However, the inventors teach for the first time that the antibacterial antifungal compound (A) according to the present disclosure has an excellent antibacterial effect against both the Gram-positive bacteria (including MRSA) and Gram-negative bacteria, and an excellent antifungal effect against various types of fungi.

In addition, the quaternary ammonium salt compound is a water-soluble compound. Therefore, it has been considered difficult to immobilize the quaternary ammonium salt compound on a hydrophobic resin surface on an as-is basis in a water-resistant and laundry-durable manner. It is common general knowledge to use the coating formable compound to confine the water-soluble compound in the resin coating, as previously described, to immobilize the water-soluble compound on resin surfaces of synthetic fibers and the like. In the field of dyeing technology, it is a known practice to modify hydrophobic polyester fibers by incorporation of sulfone groups and then dye the polyester fibers with water-soluble cationic dye. However, a method of immobilizing the water-soluble compound directly on the hydrophobic resin without modification is not known.

In contrast, the inventors conceived that, where the resin product to be incorporated with the quaternary ammonium salt compound is heated to not lower than a glass transition temperature of the resin of the resin product to allow the quaternary ammonium salt compound to infiltrate into voids present in amorphous resin portions, the compound can be chemically bonded to unreacted functional groups remaining in the resin. As a result of actual examination, the inventors found that a quaternary ammonium salt compound having a relatively small molecular weight, e.g., having a molecular weight of not greater than 1500, can be incorporated into the amorphous resin portions and bonded to the functional groups of the resin by hydrogen bonding or the like to be immobilized on the resin product.

According to the inventive production method, the specific antibacterial antifungal compound (A) having antibacterial and antifungal effects against a wide variety of bacteria and fungi can be directly chemically bonded and immobilized on the resin product without the formation of the resin coating or the like. Thus, the antibacterial/antifungal finished product can be produced as having excellent water resistance and laundry durability. The production does not require a special apparatus, but equipment (e.g., a dyeing equipment for fiber products) adapted to heat-treat the resin product in contact with the treatment liquid containing the antibacterial antifungal compound (A) can be used on an as-is basis for the production, thereby reducing the production costs. Without the need for the coating formable compound (i.e., a binder resin) for the immobilization of the antibacterial antifungal compound (A), an additional material cost is not required for the production.

The inventive antibacterial/antifungal finished product has excellent antibacterial and antifungal properties against a wide variety of bacteria and fungi, and the antibacterial and antifungal properties can be effectively maintained for a longer period of time with water resistance and laundry durability. The antibacterial/antifungal finished product can be repeatedly washed with water, wiped with a wet cloth or subjected to laundry without losing the antibacterial and antifungal properties and, therefore, can be maintained clean for a longer period of time.

Where the resin product comprises at least one resin selected from the polyester resin, the polyamide resin, the acryl resin and the polyurethane resin, particularly, the polyester resin, in the inventive production method, the antibacterial antifungal compound (A) can be more firmly and more stably immobilized on the resin product because these resins each have a greater number of unreacted functional groups. Therefore, this arrangement is advantageous.

Where the step of immobilizing the antibacterial antifungal compound (A) on at least the surface of the resin product includes the step of applying the treatment liquid to the resin product by spraying the treatment liquid onto the resin product, by immersing the resin product in the treatment liquid or by coating the resin product with the treatment liquid, and then heat-treating the resin product in the gas at 70° C. to 230° C. under normal atmospheric pressure or under increased pressure, or the step of immersing the resin product in the treatment liquid and heat-treating the resin product in the treatment liquid at 70° C. to 230° C. under normal atmospheric pressure or under increased pressure in the inventive production method, the antibacterial antifungal finished product is imparted with excellent water resistance and laundry durability. Therefore, this arrangement is advantageous.

DESCRIPTION OF EMBODIMENTS

Next, the present disclosure will be described by way of an embodiment thereof.

<Antibacterial/Antifungal Finished Product>

First, a product to be treated to be imparted with antibacterial and antifungal properties according to the embodiment of the present disclosure may be a resin product. As previously described, the resin product to be prepared before the treatment may have the same shape as a final product, or may be deformed or combined with other component to provide a final product modified in shape and/or construction.

The product to be treated may be any of various industrial materials and household articles. Exemplary resins to be used for the resin product for the antibacterial/antifungal finished product include synthetic resins such as a polyester resin, a polyamide resin, an acryl resin, a polyurethane resin and a polylactic resin, and composite materials and mixtures of any of these synthetic resins. Other exemplary materials for the resin product include mixtures of any of the aforementioned synthetic resins and other materials (e.g., metals, inorganic substances and the like). Synthetic fibers of any of these synthetic resins are also usable for the product to be treated. The product to be treated also includes fiber blend materials including any synthetic fibers and natural fibers such as cotton, rayon, wool or silk.

Particularly, preferred examples of the resin to be used for the antibacterial/antifungal finished product with a higher demand and required to have laundry durability include polyester resins such as polyethylene terephthalates, polytrimethylene terephthalates, polybutylene terephthalates and polylactate resins, and mixtures of any of these polyester resins and another resin (in the case of the fiber product, fiber blend materials including fibers of any of these polyester resins and fibers of another resin). The embodiment of the present disclosure is applicable to antibacterial/antifungal finished products made of any of these materials.

Where the product to be treated is a fiber product in the embodiment of the present disclosure, examples of the fiber product include yarns, strings, ropes and fabrics (woven fabrics, knitted fabrics and nonwoven fabrics). Specific examples of the household articles include bedding materials (curtains, bed sheets, towels, bed fabrics, bed padding, mattresses, carpets, pillow covers and the like), garments (coats, suits, sweaters, blouses, shirts, underwear, caps, face masks, socks, gloves and the like), and uniforms (medical gowns, working clothes, school uniforms and the like). The product to be treated is not limited to the fiber products, but other examples thereof include household articles and industrial materials formed from resin materials such as resin sheets and resin films. Specific examples include nursing-care sheets, shower curtains, automotive seats, seat covers, interior materials such as ceiling materials, tents, insect/bird screens, partition sheets, air conditioner filters, vacuum cleaner filters, masks, tablecloths, desk mats, aprons, wall sheets and wrapping sheets. Other examples include medical articles (medical beds, wheelchairs, sterilization bags and the like), sanitary articles (toilet bowls, cleaning brushes, dust boxes, disposable gloves, disposable masks and the like), and cooking articles (serving tables, trays and the like). The embodiment of the present disclosure is applicable not only to sheet-shaped products and film-shaped products but also to cured resin products having predetermined shapes, which may be subjected to the antibacterial/antifungal treatment in the same manner.

<Antibacterial Antifungal Compound (A)>

An antibacterial antifungal compound (A) to be used in the embodiment of the present disclosure is a quaternary ammonium salt compound having a molecular weight of not greater than 1500.

Examples of the quaternary ammonium salt compound include tetramethylammonium iodide, trimethyldecylammonium bromide, didecyldimethylammonium bromide (hereinafter abbreviated as "DDAB"), dodecyldimethyl-2-phenoxyethylammonium bromide, lauryltrimethylammonium bromide, cetyltrimethylammonium bromide, didecyldimethylammonium chloride (hereinafter abbreviated as "DDAC"), trimethylammonium chloride, trimethyldodecylammonium chloride, trimethyltetradecylammonium chloride, cetylpyridinium chloride, trimethylhexadecylammonium chloride, trimethyloctadecylammonium chloride, didecylmonomethylhydroxyethylammonium bromide, alkyldimethylhydroxyethylammonium chlorides, alkyltrimethylammonium bromides, dioctyldimethylammonium chloride, dioctyldimethylammonium bromide, octyldecyldimethylammonium chloride, octyldecyldimethylammonium bromide, methylbenzethonium chloride, alkyldimethylbenzylammonium chlorides (hereinafter abbreviated as "BAC"), alkylpyridiniumammonium chlorides, dialkylmethylbenzylammonium chlorides, didecyldimethylammonium adipate (hereinafter abbreviated as "DDAA"), didecyldimethylammonium gluconate, didecyldimethylammonium propionate, N,N-didecyl-N-methyl-poly(oxyethyl)ammonium propionate, didecylmonomethylhydroxyethylammonium adipate, didecylmonomethylhydroxyethylammonium gluconate, didecylmonomethylhydroxyethylammonium sulfonate, alkyldimethylhydroxyethylammonium adipates, alkyldimethylhydroxyethylammonium gluconates, alkyltrimethylammonium adipates, alkyltrimethylammonium gluconates, dioctyldimethylammonium adipate, dioctyldimethylammonium gluconate, octyldecyldimethylammonium adipate, octyldecyldimethylammonium gluconate, didecylmethylpolyoxyethyleneammonium, didecylmethylpolyoxyethyleneammonium gluconate and didecylmethylpolyoxyethyleneammonium propionate. Polymers, such as poly[oxyethylene(dimethylimino)ethylene(dimethylimino) ethylene dichloride], poly[oxyethylene(dimethyliminio) trimethylene(dimethyliminio)ethylene dichloride] and polydiallyldimethylammonium chloride, each having a molecular weight of not greater than 1500 are also usable.

Among these, the DDAB, the DDAC, the BAC, the DDAA and the like are particularly preferred, and may be used alone or in combination.

<Treatment Liquid>

In a production method according to the embodiment of the present disclosure, a treatment liquid containing the antibacterial antifungal compound (A) of the quaternary ammonium salt compound is prepared. The treatment liquid is an aqueous solution of the antibacterial antifungal compound (A) generally prepared by dissolving the antibacterial antifungal compound (A) in water. In some cases, the treatment liquid may be a solution of the antibacterial antifungal compound (A) employing an organic solvent, a dispersion of the antibacterial antifungal compound (A), or the like. Various auxiliary agents and additives may be blended in the treatment liquid depending on the type of the resin product to be treated and conditions for the treatment.

<Auxiliary Agents and Additives Usable for Treatment Liquid>

Where a fiber blend product including the polyester fibers and the natural fibers such as cotton, rayon, wool or silk or a fiber blend product including the polyester fibers and the polyamide, acryl or polyurethane fibers is treated, for example, fibers other than the polyester fibers are liable to be abnormally discolored, hardened or shrunk due to the action of the cation of the antibacterial antifungal compound (A) or to lose the antibacterial and antifungal properties depending on the treatment temperature and the treatment period to be employed for the treatment of the fiber blend product. In order to prevent an abnormality, fiber treatment agents such as a fixer, a dye retardant and a fluorescent brightening agent are preferably used as the auxiliary agents. Similarly, where a resin product made of a resin blend material including the polyester resin and the polyamide, acryl or polyurethane resin is treated, the fiber treatment agents are preferably used.

Specific examples of the fiber treatment agents include: alkali salt compounds typified by anhydrous sodium carbonate; neutral salt compounds typified by sodium sulfate (Glauber's salt); nonionic surface active agents such as of an alkyl ether type, a polycyclic phenyl ether type, a sorbitan derivative type and an aliphatic polyether type; cationic surface active agents typified by quaternary ammonium salts (excluding the quaternary ammonium salt compound to be used as the antibacterial antifungal compound (A)); anionic surface active agents typified by sodium dialkyl succinate sulfonates and naphthalenesulfonic acid-formalin condensates; and fluorescent brightening agents typified by bis (triazinylamino)stilbene disulfonic acid derivatives, bis-styrylbiphenyl derivatives, coumarin derivatives and pyrazoline derivatives, which may be used alone or in combination.

Other exemplary additives to be blended as required include a swelling agent, a penetrating agent, an emulsifying/dispersing agent, a metal ion sequestering agent, a level dyeing agent, a softening agent, a suspending agent, a migration inhibitor, a carrier, a dye resisting agent, a wrinkle preventing agent and a texturing agent.

Depending on the types of the auxiliary agents and the additives to be used for the treatment liquid and the material for the resin product, a water-soluble organic solvent such as ethanol, n-propanol or ethylene glycol may be used together with water or instead of water. In some cases, a nonaqueous solvent may be used.

<Production Method for Antibacterial/Antifungal Finished Product>

Next, an antibacterial/antifungal finished product production method according to the embodiment of the present disclosure will be described. In the production method according to the embodiment of the present disclosure, the resin product for the intended product is brought into contact with the treatment liquid containing the antibacterial antifungal compound (A) described above and, in this state, a predetermined heat treatment is performed. The method of bringing the resin product into contact with the treatment liquid and the method of performing the heat treatment with the resin product in contact with the treatment liquid are properly selected depending on the type of the resin product to be treated and the material for the resin product.

Exemplary methods include: a first method in which the resin product is immersed in the treatment liquid and, in this state, heat-treated at a predetermined temperature under a predetermined pressure; and a second method in which the treatment liquid is applied to the resin product under a normal atmospheric pressure by immersion (impregnation), spraying, coating or the like, and the resin product is squeezed at a predetermined squeezing percentage by means of a mangle or by centrifugal separation and then heat-treated under a normal atmospheric pressure or under an increased pressure.

In the first method, the proportion of the antibacterial antifungal compound (A) to be contained in the treatment liquid for the fiber product, for example, is preferably 0.005 to 20.0% owf (on weight of fiber, or w/w based on the weight of the resin product), more preferably 0.01 to 10.0% owf. The liquid ratio (the weight ratio of the solution to the product to be treated) is preferably 1:5 to 1:30, more preferably, 1:5 to 1:20.

The resin product is immersed in the treatment liquid under normal atmospheric pressure or under increased pressure, and treatment conditions including a temperature, a period and a pressure for the heat treatment in the immersed state are properly set depending on the material for the resin product and the shape of the resin product. Typically, the treatment temperature is set within a range of 70° C. to 230° C., and the treatment period is set within a range of 0.1 minute to 60 minutes. As the temperature and the pressure are increased, the treatment period is reduced. Where a resin product for which the heat treatment at a higher temperature for a longer period is not preferred is heat-treated, the heat treatment conditions are preferably alleviated by applying the pressure. Where resin products are sequentially treated, it is preferred, in terms of the equipment, to perform the treatment under normal atmospheric pressure. Where resin products are treated in a batch, it is preferred to reduce the treatment period by performing the treatment under increased pressure. The pressure to be applied to the resin products for the heat treatment is not limited, but the pressure may be in a pressure range so as to occur when the heat treatment is performed in a sealed system.

If the proportion of the antibacterial antifungal compound (A) is excessively small, the resulting antibacterial/antifungal finished product is liable to have poorer antibacterial and antifungal properties. If the proportion of the antibacterial antifungal compound (A) is excessively great, on the other hand, the resin product is disadvantageously liable to suffer from the physical abnormalities (hardening, shrinkage, discoloration and the like). If the heat treatment is performed at an insufficient temperature for an insufficient treatment period under higher liquid ratio conditions, the antibacterial antifungal compound (A) is liable to be insufficiently immobilized on the resin product, resulting in poorer antibacterial and antifungal properties. If the treatment temperature and/or the treatment period exceed the aforementioned corresponding ranges, the resin product is disadvantageously liable to suffer from the physical abnormalities (hardening, shrinkage, discoloration and the like), and the antibacterial antifungal compound (A) is liable to be thermally evaporated or decomposed.

In the second method, where the treatment liquid is applied to the resin product under normal atmospheric pressure by the immersion (impregnation), the spraying, the coating or the like, the proportion of the antibacterial antifungal compound (A) to be contained in the treatment liquid for the fiber product, for example, is preferably 0.005 to 20.0% ows (on weight of solution, or w/w based on the concentration of the antibacterial antifungal compound (A) in the treatment liquid), more preferably 0.01 to 10.0% ows. The squeezing percentage, which may vary depending on the type of the resin product, is preferably 30 to 200%.

After the application of the treatment liquid to the resin product, the heat treatment is performed, for example, at a treatment temperature of 70° C. to 230° C. under normal atmospheric pressure or under increased pressure. More specifically, the resin product is dried at 100° C. to 130° C. for 1 to 3 minutes (where the resin product has a smaller unit weight, the preliminary drying may be obviated), and then a curing treatment is performed at 140° C. to 230° C. The curing period, which may vary depending on the unit weight and the physical properties of the resin product, is preferably about 30 seconds to about 1 hour. If the antibacterial antifungal compound (A) is present in a smaller proportion in the treatment liquid in this method, the resulting antibacterial/antifungal finished product is liable to have poorer antibacterial and antifungal properties. If the treatment temperature and/or the treatment period are insufficient, the antibacterial/antifungal finished product is liable to be poorer in antibacterial and antifungal properties or to be insufficient in water resistance and laundry durability. If the proportion of the antibacterial antifungal compound (A), the treatment temperature and/or the treatment period are excessively great, on the other hand, the resin product is disadvantageously liable to suffer from the physical abnormalities (hardening, shrinkage, discoloration and the like), and the antibacterial antifungal compound (A) is liable to be thermally evaporated or decomposed.

<Properties of Antibacterial/Antifungal Finished Product and Evaluation of Antibacterial/Antifungal Finished Product>

As described above, the antibacterial/antifungal finished product produced by the production method according to the embodiment of the present disclosure has excellent antibacterial and antifungal properties against a wide variety of bacteria and a wide variety of fungi. Further, the antibacterial/antifungal finished product maintains excellent antibacterial and antifungal properties with water resistance and laundry durability for a longer period of time and, therefore, can be repeatedly washed with water, wiped with a wet cloth or subjected to laundry to be thereby kept clean during prolonged use.

Specific examples of the bacteria and the fungi for which the antibacterial/antifungal finished product according to the embodiment of the present disclosure is effective are as follows:

[Bacteria]
Gram-positive bacteria: *Staphylococcus aureus*, MRSA (Methicillin-resistant *Staphylococcus aureus*), *Bacillus subtilis*, *Bacillus cereus* and the like.
Gram-negative bacteria: *Escherichia coli, Klebsiella pneumoniae, Salmonella typhimurium, Pseudomonas aeruginosa* and the like.

[Fungi (Including Yeast)]
*Aspergillus niger, Penicillium citrinum, Cladosporium cladosporioides, Trichophyton mentagrophytes, Candida albicans* and the like.

Next, test methods for evaluating the antibacterial/antifungal finished product for the antibacterial and antifungal properties according to the embodiment of the present disclosure will be described.

[Test Method for Laundry Durability Evaluation]

In laundry durability evaluation, the antibacterial/antifungal finished product is evaluated for household laundry durability by performing the following household laundry process or is evaluated for industrial laundry durability by performing the following industrial laundry process, depending on the type of the antibacterial/antifungal finished product to be evaluated.

(1) Household Laundry Process (at 40° C.)

The antibacterial/antifungal finished product is laundered at 40° C. 10 times by a laundry method conforming to JIS L0217-103.

(2) Industrial Laundry Process (at 80° C.)

The antibacterial/antifungal finished product is laundered at 80° C. 10 to 100 times by a bacteriostatic laundry method specified by JTETC (a simplified method conforming to Ordinance No. 13 issued by the Ministry of Health, Labor and Welfare).

The antibacterial/antifungal finished product to be evaluated is subjected to the household laundry process 10 times or to the industrial laundry process 50 to 100 times. Then, 5 g of the antibacterial/antifungal finished product subjected to the laundry process is sampled and immersed in 100 g of deionized water. In this state, the antibacterial antifungal compound (A) is extracted at 130° C. for 30 minutes in a pressure-proof stainless steel container. The antibacterial antifungal compound (A) in the resulting extract is quantitatively analyzed. (The quantitative analysis is performed by a UV-visible spectrophotometer in conformity with "Quantitative Analysis of Cationic Surface Active Agent, Photoelectric Colorimetric Method with Phenol Blue Complex" Surface Active Agent Handbook, First Edition, published on Oct. 1, 1968 by Kogaku Tosho. In the quantitative analysis, an eosin complex is used instead of the phenol blue complex.)

In the embodiment of the present disclosure, the antibacterial and antifungal property evaluation of the antibacterial/antifungal finished product is based on bactericidal activity values against at least three types of bacteria selected from *Staphylococcus aureus*, methicillin-resistant *Staphylococcus aureus* (MRSA), *Klebsiella pneumoniae, Bacillus subtilis, Bacillus cereus, Escherichia coli, Salmonella typhimurium* and *Pseudomonas aeruginosa*, and antifungal activity values against at least two types of fungi selected from *Aspergillus niger, Penicillium citrinum, Cladosporium cladosporioides, Trichophyton mentagrophytes* and *Candida albicans*. Where the bactericidal activity values are not less than 0 and the antifungal activity values are not less than 2, the antibacterial/antifungal finished product is rated as effective.

The bactericidal activity values are originally defined for antibacterial property evaluation of an antibacterial finished textile product by standards (JIS L1902) specified by Japan Textile Evaluation Technology Council (JTETC) to indicate to what extent the antibacterial finished textile product is capable of suppressing proliferation of bacteria. Where the product to be evaluated is not a textile product, "fabric" of "standard fabric" or "finished fabric" is replaced with "a sample of a resin product of a predetermined shape" in the evaluation method for the evaluation of the antibacterial finished textile product.

The bactericidal activity values are each determined from the following expression (1). Where the bactericidal activity values of the product against *Staphylococcus aureus* and *Klebsiella pneumoniae* after a predetermined laundry process are not less than 0 (zero), this means that the product is imparted with an antibacterial property by an antibacterial finishing process certified as effective by JTETC.

$$\text{Bactericidal activity value} = \log B_0 - \log B_1 \quad (1)$$

wherein $B_0$ is the average living bacteria number of three samples immediately after inoculation of bacteria to the standard fabric, and $B_1$ is the average living bacteria number of three samples after 18-hour incubation of the finished fabric.

Where the bactericidal activity value of the product against MRSA after a predetermined laundry process is greater than 0, this means that the product is imparted with a specific antibacterial property in addition to the above antibacterial property by a specific antibacterial finishing process certified as effective by JTETC.

Similarly, the antifungal activity values are originally defined for antifungal property evaluation of an antifungal finished textile product by standards (ISO 13629-1) specified by JTETC to indicate to what extent the antifungal finished textile product is capable of suppressing growth of fungi. In determination of the antifungal activity values as in the determination of the bactericidal activity values, where the product to be evaluated is not a textile product, "fabric" of "standard fabric" or "finished fabric" is replaced with "a sample of a resin product of a predetermined shape" in the evaluation method for the evaluation of the antifungal finished textile product.

The antifungal activity values are each determined from the following expression (2). Where the antifungal activity values of the product against at least two of the five types of fungi are not less than 2, this means that the product is imparted with an antifungal property by an antifungal finishing process certified as effective by JTETC (for a category of products other than products to be subjected to a smaller number of times of a laundry process and susceptible to the growth of fungi).

$$\text{Antifungal activity value} = (\log F_1 - \log F_0) - (\log G_1 - \log G_0) \quad (2)$$

wherein $F_1$ is the average living fungus ATP amount of three samples after 42-hour incubation of the standard fabric, $F_0$ is the average living fungus ATP amount of three samples immediately after inoculation of test fungi to the standard fabric, $G_1$ is the average living fungus ATP amount of three samples after 42-hour incubation of the finished fabric, and $G_0$ is the average living fungus ATP amount of three samples immediately after inoculation of the test fungi to the finished fabric.

Where the antifungal activity values of the product against at least two of the five types of fungi are each not less than 3, this means that the product is imparted with a specific antifungal property in addition to the above antifungal property by an antifungal finishing process certified as effective by JTETC (for a category of the products to be subjected to a smaller number of times of the laundry process and susceptible to the growth of fungi).

The antibacterial/antifungal finished product according to the embodiment of the present disclosure has an antibacterial property and an antifungal property which are appreciated not only by the JTETC's evaluations but also by evaluations specified by JIS Z2801 (Antibacterial products—Test for antibacterial activity and efficacy—Antibacterial finished plastic products) and JIS Z2911 (Methods of test for fungus resistance—Antifungal finished plastic products) comparable to the JTETC's evaluations.

EXAMPLES

Next, inventive examples will be described in conjunction with comparative examples. It should be understood that the present disclosure be not limited to the inventive examples.

In the inventive examples and the comparative examples, the quantitative analysis of the amount of a remaining compound was based on the aforementioned test method for laundry durability evaluation. An antibacterial/antifungal finished product to be evaluated was subjected to the predetermined household laundry process or the predetermined industrial laundry process. Then, 5 g of the resulting antibacterial/antifungal finished product was sampled, and immersed in 100 g of deionized water. In this state, the compound was extracted at 130° C. for 30 minutes in a pressure-proof stainless steel container. The antibacterial antifungal compound (A) or other compound in the resulting extract was quantitatively analyzed. The antibacterial/antifungal finished product was evaluated based on the following criteria:

○ (Excellent): The amount of the remaining compound was not less than 100 ppm.

Δ (Acceptable): The amount of the remaining compound was less than 100 ppm and not less than 10 ppm.

x (Unacceptable): The amount of the remaining compound was less than 10 ppm.

The abbreviations of compounds used in the inventive examples and the comparative examples are as follows:

DDAC: Didecyldimethylammonium chloride

BAC: Alkyldimethylbenzylammonium chloride

DDAB: Didecyldimethylammonium bromide

PDIEC1: Poly[oxyethylene(dimethylimino)ethylene(dimethylimino)ethylene dichloride] (having a molecular weight of 900)

PDIEC2: Same as above (having a molecular weight of 2000)

DDAA: Didecyldimethylammonium adipate

DDAP: N,N-didecyl-N-methyl-poly(oxyethyl)ammonium propionate (having a molecular weight of 2000)

PHMB: Polyhexamethylenebiguanidine chloride (having a molecular weight of 2000)

Examples 1 to 6

Polyester standard fabrics (available under the trade name of TROPICAL from Teijin Ltd., hereinafter the same) were respectively immersed in 0.32 wt. % and 0.16 wt. % aqueous solutions of DDAC, 0.32 wt. % and 0.16 wt. % aqueous solutions of BAC and 0.32 wt. % and 0.16 wt. % aqueous solutions of DDAA, then squeezed at a squeezing percentage of 100% by means of a mangle, and dried at 130° C. for 1 minute. Then, a curing treatment was performed on the resulting polyester standard fabrics under the following conditions: at 170° C. for 2 minutes; at 180° C. for 1 minute; and at 200° C. for 30 seconds. These process steps were performed under a normal atmospheric pressure, i.e., under neither an increased pressure nor a reduced pressure (in the following examples, the process steps were performed under normal atmospheric pressure unless otherwise specified). The resulting fabrics were each subjected to the household laundry process at 40° C. 10 times, and then the amount of the remaining compound was quantitatively analyzed. The fabrics thus treated were each evaluated based on the aforementioned criteria. The results are shown below in Table 1.

TABLE 1

<Amount of antibacterial antifungal compound (A) remaining after 10-time household laundry process (40° C.)>

Resin product: Polyester (fabric)

| | Compound (wt. %) | Treatment conditions | | |
|---|---|---|---|---|
| | | 170° C. × 2 min. | 180° C. × 1 min. | 200° C. × 30 sec. |
| Example 1 | DDAC (0.32) | ○ | ○ | ○ |
| Example 2 | DDAC (0.16) | ○ | ○ | ○ |
| Example 3 | BAC (0.32) | ○ | ○ | ○ |
| Example 4 | BAC (0.16) | ○ | ○ | ○ |
| Example 5 | DDAA (0.32) | ○ | ○ | ○ |
| Example 6 | DDAA (0.16) | ○ | ○ | ○ |

From the above results, it was confirmed that, where the polyester standard fabrics were heat-treated under the predetermined conditions after being brought into contact with the antibacterial antifungal compounds (A), the antibacterial antifungal compounds (A) remained immobilized on fibers of the polyester standard fabrics.

Examples 7 to 11

Polyester standard fabrics were respectively immersed in 0.32 wt. % aqueous solutions of DDAC, BAC, DDAB and PDTEC1 (having a molecular weight of 900) and then squeezed at a squeezing percentage of 100% by means of a mangle. Then, a curing treatment was performed on the resulting polyester standard fabrics at 180° C. for 1 minute. The resulting fabrics were each subjected to the industrial laundry process at 80° C. 10 times, and then the amount of the remaining compound was quantitatively analyzed. The fabrics thus treated were each evaluated based on the aforementioned criteria. The results are shown below in Table 2.

Comparative Examples 1 to 3

Polyester standard fabrics were respectively immersed in a 0.36 wt. % aqueous solution of PDIEC2 (having a molecular weight of 2000), a 0.32 wt. % aqueous solution of DDAP (having an organic carboxylic acid as a counter ion) and a 0.40 wt. % aqueous solution of PHMB (which was not an ammonium salt), and then squeezed at a squeezing percentage of 100% by means of a mangle as in Examples 7 to 11. Then, a curing treatment was performed on the resulting polyester standard fabrics at 180° C. for 1 minute. The resulting fabrics were each subjected to the industrial laundry process at 80° C. 10 times, and then the amount of the remaining compound was quantitatively analyzed. The fabrics thus treated were each evaluated based on the aforementioned criteria. The results are also shown below in Table 2.

TABLE 2

<Amount of antibacterial antifungal compound (A) remaining after 10-time industrial laundry process (80° C.)>

Resin product: Polyester (fabric)

| | Compound (wt. %) | Treatment conditions 180° C. × 1 min. |
|---|---|---|
| Example 7 | DDAC (0.32) | ○ |
| Example 8 | BAC (0.32) | ○ |
| Example 9 | DDAB (0.32) | ○ |
| Example 10 | PDIEC1 (0.32) | ○ |
| Example 11 | DDAA (0.32) | ○ |
| Comparative Example 1 | PDIEC2 (0.36) | x |
| Comparative Example 2 | DDAP (0.32) | x |
| Comparative Example 3 | PHMB (0.40) | x |

From the above results, it was confirmed that, where the polyester standard fabrics were heat-treated under the predetermined conditions after being brought into contact with the antibacterial antifungal compounds (A), the antibacterial antifungal compounds (A) remained immobilized on fibers of the polyester standard fabrics even after the industrial laundry process was performed 10 times. It was also confirmed that, where the polyester standard fabrics were heat-treated under the predetermined conditions after being brought into contact with the compounds different from the antibacterial antifungal compounds (A), the compounds insufficiently remained on fibers of the polyester standard fabrics.

Examples 12 and 13

Polyester/cotton fiber blend fabrics (each containing 80 wt. % of a polyester and 20 wt. % of cotton) were dyed with 0.5% ows of diaminostilbene sulfonic acid fluorescent brightening agent, and then dried. The resulting polyester/cotton fiber blend fabrics were respectively immersed in 0.32 wt. % and 0.60 wt. % aqueous solutions of DDAC, then squeezed at a squeezing percentage of 100% by means of a mangle, and dried at 130° C. for 1 minute. Then, a curing treatment was performed on the resulting polyester/cotton fiber blend fabrics at 170° C. for 2 minutes. The resulting fabrics were each subjected to the household laundry process at 40° C. 10 times, and then the amount of the remaining compound was quantitatively analyzed. The fabrics thus treated were evaluated based on the aforementioned criteria. The results are shown below in Table 3.

Comparative Examples 4 and 5

Polyester/cotton fiber blend fabrics (each containing 80 wt. % of a polyester and 20 wt. % of cotton) were dyed with 0.5% ows of diaminostilbene sulfonic acid fluorescent brightening agent, and then dried. The resulting polyester/cotton fiber blend fabrics were respectively immersed in a 0.60 wt. % aqueous solution of DDAP and a 0.60 wt. % aqueous solution of PHMB, then squeezed at a squeezing percentage of 100% by means of a mangle, and dried at 130° C. for 1 minute. Then, a curing treatment was performed on the resulting polyester/cotton fiber blend fabrics at 170° C. for 2 minutes. The resulting fabrics were each subjected to the household laundry process at 40° C. 10 times, and then the amount of the remaining compound was quantitatively analyzed. The fabrics thus treated were evaluated based on the aforementioned criteria. The results are also shown below in Table 3.

TABLE 3

<Amount of antibacterial antifungal compound (A) remaining after 10-time household laundry process (40° C.)>

Resin product: Polyester/cotton (fabric)

| | Compound (wt. %) | Treatment conditions 130° C. × 1 min., 170° C. × 2 min. |
|---|---|---|
| Example 12 | DDAC (0.32) | ◯ |
| Example 13 | DDAC (0.60) | ◯ |
| Comparative Example 4 | DDAP (0.60) | x |
| Comparative Example 5 | PHMB (0.60) | x |

From the above results, it was confirmed that, where the polyester/cotton fiber blend fabrics (each containing 80 wt. % of the polyester and 20 wt. % of the cotton) were heat-treated under the predetermined conditions after being brought into contact with the antibacterial antifungal compounds (A), the antibacterial antifungal compounds (A) remained immobilized on fibers of the polyester/cotton fiber blend fabrics even after the household laundry process was performed 10 times. It was also confirmed that, where the polyester/cotton fiber blend fabrics were heat-treated under the predetermined conditions after being brought into contact with the compounds different from the antibacterial antifungal compounds (A), the compounds insufficiently remained on fibers of the polyester/cotton fiber blend fabrics.

Examples 14 and 15

Polyamide fiber (nylon 6) sample fabrics (available under the trade name of NYLON-6 JERSEY from Shikisensha Co., Ltd.) were respectively immersed in 0.32 wt. % aqueous solutions of DDAC and DDAA, and then a curing treatment was performed on the resulting polyamide fiber sample fabrics at 85° C. for 45 minutes. The resulting fabrics were each subjected to the household laundry process at 40° C. 10 times, and then the amount of the remaining compound was quantitatively analyzed. The fabrics thus treated were evaluated based on the aforementioned criteria. The results are shown below in Table 4.

TABLE 4

<Amount of antibacterial antifungal compound (A) remaining after 10-time household laundry process (40° C.)>

Resin product: Polyamide (fabric)

| | Compound (wt. %) | Treatment conditions 85° C. × 45 min. |
|---|---|---|
| Example 14 | DDAC (0.32) | ◯ |
| Example 15 | DDAA (0.32) | ◯ |

From the above results, it was confirmed that, where the polyamide fiber sample fabrics were brought into contact with the antibacterial antifungal compounds (A) and then the curing treatment was performed on the polyamide fiber sample fabrics under the predetermined conditions, the antibacterial antifungal compounds (A) remained immobilized on fibers of the polyamide fiber sample fabrics even after the household laundry process was performed 10 times.

Examples 16 to 21

Polyester standard fabrics were respectively immersed in 0.40 wt. %, 0.20 wt. % and 0.10 wt. % aqueous solutions of DDAC and 0.10 wt. % aqueous solutions of DDAA, BAC and PDIEC1, and then a curing treatment was performed on the resulting polyester standard fabrics at 180° C. for 1 minute. The resulting fabrics were each subjected to the industrial laundry process at 80° C. 100 times. Thereafter, the bactericidal activity values of the fabrics thus treated were determined based on the JTETC evaluation standards. The results are shown below in Table 5.

Comparative Examples 6 to 8

Polyester standard fabrics were immersed in 1.0 wt. % aqueous solutions of PHMB, PDIEC2 and DDAP, and then squeezed at a squeezing percentage of 100% by means of a mangle. Then, a curing treatment was performed on the resulting polyester standard fabrics at 180° C. for 1 minute. The resulting fabrics were each subjected to the industrial laundry process at 80° C. 100 times. Thereafter, the bactericidal activity values of the fabrics thus treated were determined based on the JTETC evaluation standards as in Examples 16 to 21. The results are shown below in Table 5.

TABLE 5

<Bactericidal activity value after 100-time industrial laundry process (80° C.)>

Resin product: Polyester (fabric)
Treatment conditions: 180° C. × 1 min.

| | Compound (wt. %) | Bactericidal activity value | | |
|---|---|---|---|---|
| | | Staphylococcus aureus | MRSA | Klebsiella pneumoniae |
| Example 16 | DDAC (0.40) | >3.1 | >3.1 | >3.1 |
| Example 17 | DDAC (0.20) | >3.1 | >3.1 | >3.1 |
| Example 18 | DDAC (0.10) | >3.1 | >3.1 | >3.1 |
| Example 19 | DDAA (0.10) | >3.1 | >3.1 | >3.1 |
| Example 20 | BAC (0.10) | >3.1 | >3.1 | >3.1 |
| Example 21 | PDIEC1 (0.10) | >3.1 | >3.1 | >3.1 |
| Comparative Example 6 | PHMB (1.0) | <0 | <0 | <0 |
| Comparative Example 7 | PDIEC2 (1.0) | <0 | <0 | <0 |
| Comparative Example 8 | DDAP (1.0) | <0 | <0 | <0 |

From the above results, it was confirmed that the polyester standard fabrics heat-treated under the predetermined conditions after being brought into contact with the antibacterial antifungal compounds (A) each had satisfactory bactericidal activity values with the antibacterial antifungal compounds (A) remaining on fibers thereof even after the industrial laundry process was performed 100 times. It was also confirmed that the polyester standard fabrics brought into contact with the compounds different from the antibacterial antifungal compounds (A) were unsatisfactory in bactericidal activity values even if being heat-treated under the predetermined conditions.

Examples 22 to 25

Polyester standard fabrics were respectively immersed in a 0.20 wt. % aqueous solution of DDAC, a 0.20 wt. % aqueous solution of DDAA, a 0.40 wt. % aqueous solution of BAC and a 1.0 wt. % aqueous solution of PDIEC1, and then a curing treatment was performed on the resulting polyester standard fabrics at 180° C. for 1 minute. The resulting fabrics were each subjected to the household laundry process at 40° C. 10 times. Thereafter, the antifungal activity values of the fabrics thus treated were determined based on the JTETC evaluation standards. The results are shown below in Table 6.

Comparative Examples 9 to 11

Polyester standard fabrics were respectively immersed in 1.0 wt. % aqueous solutions of PHMB, PDIEC2 and DDAP, and then a curing treatment was performed on the resulting polyester standard fabrics at 180° C. for 1 minute. The resulting fabrics were each subjected to the household laundry process at 40° C. 10 times. Thereafter, the antifungal activity values of the fabrics thus treated were determined based on the JTETC evaluation standards. The results are shown below in Table 6.

TABLE 6

<Antifungal activity value after 10-time household laundry process (40° C.)>

Resin product: Polyester (fabric)
Treatment conditions: 180° C. × 1 min.

| | | Antifungal activity value | | | |
|---|---|---|---|---|---|
| | Compound (wt. %) | Aspergillus niger | Penicillium citrinum | Cladosporium cladosporioides | Trichophyton mentagrophytes |
| Example 22 | DDAC (0.20) | ≥2.0 | ≥2.0 | ≥2.0 | ≥2.0 |
| Example 23 | DDAA (0.20) | ≥2.0 | ≥2.0 | ≥2.0 | ≥2.0 |
| Example 24 | BAC (0.40) | ≥2.0 | ≥2.0 | ≥2.0 | ≥2.0 |
| Example 25 | PDIEC1 (1.0) | ≥2.0 | ≥2.0 | ≥2.0 | ≥2.0 |
| Comparative Example 9 | PHMB (1.0) | <2.0 | <2.0 | <2.0 | <2.0 |
| Comparative Example 10 | PDIEC2 (1.0) | <2.0 | <2.0 | <2.0 | <2.0 |
| Comparative Example 11 | DDAP (1.0) | <2.0 | <2.0 | <2.0 | <2.0 |

From the above results, it was confirmed that the polyester standard fabrics heat-treated under the predetermined conditions after being brought into contact with the antibacterial antifungal compounds (A) each had satisfactory antifungal activity with the antibacterial antifungal compounds (A) remaining on fibers thereof even after the household laundry process was performed 10 times. It was also confirmed that the polyester standard fabrics brought into contact with the compounds different from the antibacterial antifungal compounds (A) did not exhibit the antifungal activity with the compounds insufficiently remaining on fibers thereof even if being heat-treated under the predetermined conditions.

The results shown in Tables 1 to 6 indicate that the products of the inventive examples produced by immersing the fabrics of the synthetic fibers or the fabrics of the fiber blend including the synthetic fibers and the natural fibers in the treatment liquids containing the antibacterial antifungal compounds (A) and heat-treating the fabrics according to the embodiment of the present disclosure were satisfactory in antibacterial and antifungal properties with the antibacterial antifungal compounds (A) immobilized on the fabrics and remaining on the fabrics even after the household laundry process was performed 10 times or the industrial laundry process was performed 100 times.

In contrast, the products of the comparative examples produced by employing the compounds (DDAP, PHMB and PDIEC (which is a quaternary ammonium salt compound having a molecular weight of greater than 1500)) different from the antibacterial antifungal compounds (A) of the quaternary ammonium salt compounds according to the embodiment of the present disclosure were insufficient in antibacterial and antifungal properties because the compounds were not immobilized on the fabrics.

While specific forms of the embodiment of the present disclosure have been shown in the aforementioned inventive examples, the inventive examples are merely illustrative of the disclosure but not limitative of the disclosure. It is contemplated that various modifications apparent to those skilled in the art could be made within the scope of the disclosure. This application is based on Japanese Patent Application No. 2014-189755 filed on Sep. 18, 2014, the disclosure of which is incorporated herein by reference.

The present disclosure is utilized to provide an antibacterial antifungal finished product which has water-resistant and laundry-durable antibacterial and antifungal properties against a wide variety of bacteria and fungi.

The invention claimed is:

1. An antibacterial/antifungal finished product production method for producing an antibacterial/antifungal finished product having antibacterial and antifungal properties, the method comprising the steps of:
    preparing a resin product;
    preparing a treatment liquid containing an antibacterial antifungal compound of a quaternary ammonium salt compound having a molecular weight of not greater than 1500 in a range of from 0.1% to 0.6% by weight based on the overall treatment liquid; and
    immobilizing the antibacterial antifungal compound on at least a surface of the resin product by heat-treating the resin product under a normal atmospheric pressure or under an increased pressure, with the resin product in contact with the treatment liquid,
    wherein the heat-treating comprises a curing treatment performed at 140° C. to 230° C.,
    wherein the antibacterial antifungal compound is immobilized on the resin product such that the antibacterial antifungal compound is directly bonded to the resin product without another compound interposed therebetween, and
    wherein the quaternary ammonium salt compound is at least one selected from the group consisting of tetramethylammonium iodide, trim ethyldecylammonium bromide, didecyldimethylammonium bromide, dodecyldimethyl-2-phenoxyethylammonium bromide, lauryltrimethylammonium bromide, cetyltrimethylammonium bromide, didecyldimethylammonium chloride, trimethylammonium chloride, trimethyldodecylammonium chloride, trimethyltetradecyl ammonium chloride, cetylpyridinium chloride, trimethylhexadecylammonium chloride, trimethyloctadecyl ammonium chloride, didecylmonomethylhydroxyethylammonium bromide, alkyldimethylhydroxyethylammonium chlorides, alkyltrimethylammonium bromides, dioctyldimethylammonium chloride, dioctyldimethylammonium bromide, octyldecyldimethylammonium chloride, octyldecyldimethylammonium bromide, methylbenzethonium chloride, alkyldimethylbenzylammonium chlorides, alkylpyridiniumammonium chlorides, dialkylmethylbenzylammonium chlorides, didecyldimethylammonium adipate, didecyldimethylammonium gluconate, didecyldimethylammonium propionate, N,N-didecyl-N-methyl-poly(oxyethyl)ammonium propionate, didecylmonomethylhydroxyethylammonium adipate, didecylmonomethylhydroxyethylammonium gluconate, didecylmonomethylhydroxyethylammonium sulfonate, alkyldimethylhydroxyethylammonium adipates, alkyldimethylhydroxyethylammonium gluconates, alkyltrimethylammonium adipates, alkyltrimethylammonium gluconates, dioctyldimethylammonium adipate, dioctyldimethylammonium gluconate, octyldecyldimethylammonium adipate, octyldecyldimethylammonium gluconate, didecylmethylpolyoxyethyleneammonium, didecylmethylpolyoxyethyleneammonium gluconate, didecylmethylpolyoxyethyleneammonium propionate, poly[oxyethylene(dimethylimino)ethylene(dimethylimino)ethylene dichloride], poly[oxyethylene(dimethyliminio)trimethylene(dimethyliminio)ethylene dichloride], and polydiallyldimethylammonium chloride.

2. The antibacterial/antifungal finished product production method according to claim 1, wherein the resin product comprises at least one resin selected from a polyester resin, a polyamide resin, an acryl resin and a polyurethane resin.

3. The antibacterial/antifungal finished product production method according to claim 1, wherein the resin product comprises a polyester resin.

4. The antibacterial/antifungal finished product production method according to claim 1,
wherein, in the step of immobilizing the antibacterial antifungal compound on at least the surface of the resin product, the resin product is brought into contact with the treatment liquid by spraying the treatment liquid onto the resin product, by immersing the resin product in the treatment liquid or by coating the resin product with the treatment liquid.

5. The antibacterial/antifungal finished product production method according to claim 1,
wherein, in the step of immobilizing the antibacterial antifungal compound on at least the surface of the resin product, the resin product is brought into contact with the treatment liquid by immersing the resin product in the treatment liquid.

6. The antibacterial/antifungal finished product production method according to claim 1, wherein the heat-treating further comprises, prior to the curing treatment, drying at 100° C. to 130° C.

7. The antibacterial/antifungal finished product production method according to claim 6, wherein the drying is performed for 1 to 3 minutes.

8. The antibacterial/antifungal finished product production method according to claim 1, wherein the curing treatment is performed for about 30 seconds to about 1 hour.

9. An antibacterial/antifungal finished product produced by the production method according to claim 1, the antibacterial/antifungal finished product comprising:

a resin product; and
an antibacterial antifungal compound immobilized on at least a surface of the resin product;
wherein the antibacterial antifungal compound is a quaternary ammonium salt compound having a molecular weight of not greater than 1500;
wherein the antibacterial antifungal compound is immobilized on the resin product such that the antibacterial antifungal compound is directly bonded to the resin product without another compound interposed therebetween;
wherein the antibacterial/antifungal finished product has bactericidal activity values of not less than 0 against at least three types of bacteria selected from *Staphylococcus aureus*, methicillin-resistant *Staphylococcus aureus, Klebsiella pneumoniae, Bacillus subtilis, Bacillus cereus, Escherichia coli, Salmonella typhimurium* and *Pseudomonas aeruginosa*, and antifungal activity values of not less than 2 against at least two types of fungi selected from *Aspergillus niger, Penicillium citrinum, Cladosporium cladosporioides, Trichophyton mentagrophytes* and *Candida albicans*, and
wherein the quaternary ammonium salt compound is at least one selected from the group consisting of tetramethylammonium iodide, trimethyldecylammonium bromide, didecyldimethylammonium bromide, dodecyl dim ethyl-2-phenoxyethylammonium bromide, lauryltrimethylammonium bromide, cetyltrimethylammonium bromide, didecyldimethylammonium chloride, trimethylammonium chloride, trimethyldodecylammonium chloride, trimethyltetradecylammonium chloride, cetylpyridinium chloride, trimethylhexadecylammonium chloride, trimethyloctadecyl ammonium chloride, didecylmonomethylhydroxyethylammonium bromide, alkyldimethylhydroxyethylammonium chlorides, alkyltrimethylammonium bromides, dioctyldimethylammonium chloride, dioctyldimethylammonium bromide, octyldecyldimethylammonium chloride, octyldecyldimethylammonium bromide, methylbenzethonium chloride, alkyldimethylbenzylammonium chlorides, alkylpyridiniumammonium chlorides, dialkylmethylbenzylammonium chlorides, didecyldimethylammonium adipate, didecyldimethylammonium gluconate, didecyldimethylammonium propionate, N,N-didecyl-N-methyl-poly(oxyethyl)ammonium propionate, didecylmonomethylhydroxyethylammonium adipate, didecylmonomethylhydroxyethylammonium gluconate, didecylmonomethylhydroxyethylammonium sulfonate, alkyldimethylhydroxyethyl ammonium adipates, alkyldimethylhydroxyethylammonium gluconates, alkyltrimethylammonium adipates, alkyltrimethylammonium gluconates, dioctyldimethylammonium adipate, dioctyldimethylammonium gluconate, octyldecyldimethylammonium adipate, octyldecyldimethylammonium gluconate, didecylmethylpolyoxyethyleneammonium, didecylmethylpolyoxyethyleneammonium gluconate, didecylmethylpolyoxyethyleneammonium propionate, poly[oxyethylene(dimethylimino)ethylene(dimethylimino)ethylene dichloride], poly[oxyethylene(dimethyliminio)trimethylene(dimethyliminio)ethylene dichloride], and polydiallyldimethylammonium chloride.

10. The antibacterial/antifungal finished product according to claim 9, wherein the resin product comprises at least one resin selected from a polyester resin, a polyamide resin, an acryl resin and a polyurethane resin.

11. The antibacterial/antifungal finished product according to claim 9, wherein the resin product comprises a polyester resin.

12. The antibacterial/antifungal finished product according to claim 9, wherein the resin product is a fiber product.

13. The antibacterial/antifungal finished product according to claim 9, wherein the resin product is a resin sheet, a resin film or a cured resin product having a predetermined shape.

14. The antibacterial/antifungal finished product according to claim 9, wherein the resin product has bactericidal activity values of not less than 0 against at least three types of bacteria selected from *Staphylococcus aureus*, methicillin-resistant *Staphylococcus aureus*, *Klebsiella pneumoniae*, *Bacillus subtilis*, *Bacillus cereus*, *Escherichia coli*, *Salmonella typhimurium* and *Pseudomonas aeruginosa*, and antifungal activity values of not less than 2 against at least two types of fungi selected from *Aspergillus niger*, *Penicillium citrinum*, *Cladosporium cladosporioides*, *Trichophyton mentagrophytes* and *Candida albicans* after being subjected to a household laundry process at 40° C. 10 times in conformity to JIS L0217-103 or after being subjected to an industrial laundry process certified by JTETC at 80° C. 100 times.

\* \* \* \* \*